(12) United States Patent
Dou et al.

(10) Patent No.: US 11,025,316 B2
(45) Date of Patent: Jun. 1, 2021

(54) METHOD AND APPARATUS USED FOR DATA TRANSMISSION

(71) Applicant: HUAWEI TECHNOLOGIES CO., LTD., Guangdong (CN)

(72) Inventors: Shengyue Dou, Shanghai (CN); Yuanjie Li, Shanghai (CN); Haibao Ren, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,645

(22) Filed: Mar. 28, 2019

(65) Prior Publication Data
US 2019/0222274 A1    Jul. 18, 2019

Related U.S. Application Data

(63) Continuation of application No. PCT/CN2017/101012, filed on Sep. 8, 2017.

(30) Foreign Application Priority Data

Sep. 30, 2016 (CN) .......................... 201610872741.8

(51) Int. Cl.
*H04B 7/0456* (2017.01)
*H04B 7/024* (2017.01)
(Continued)

(52) U.S. Cl.
CPC .......... *H04B 7/0473* (2013.01); *H04B 7/024* (2013.01); *H04B 7/04* (2013.01); *H04B 7/0465* (2013.01);
(Continued)

(58) Field of Classification Search
CPC .... H04B 7/0617; H04B 7/0473; H04B 7/024; H04B 7/04; H04B 7/0465; H04B 7/0486; H04W 72/042; H04L 25/03929
See application file for complete search history.

(56) References Cited

U.S. PATENT DOCUMENTS 9,389,009 B2 * 7/2016 Olson, Jr. ............... F25C 1/246
2012/0300728 A1 * 11/2012 Lee ....................... H04L 5/0053
370/329
(Continued)

FOREIGN PATENT DOCUMENTS

| CN | 103974316 A | 8/2014 |
| CN | 104106223 A | 10/2014 |
| CN | 104770039 A | 7/2015 |

OTHER PUBLICATIONS

International Search Report, dated Nov. 3, 2017, in International Application No. PCT/CN2017/101012 (4 pp.).
(Continued)

*Primary Examiner* — Sophia Vlahos
(74) *Attorney, Agent, or Firm* — Leydig, Voit & Mayer, Ltd.

(57) ABSTRACT

Embodiments of this application disclose a method used for data transmission. This method is applicable to coordinated transmission/reception in NR, and is relatively flexible. This method includes: determining, by a network device, a plurality of groups of antenna ports, where each group of antenna ports includes at least two antenna ports, and any two antenna ports in a same group of antenna ports meet quasi-co-location QCL; and sending, by the network device, at least one piece of first indication information to a terminal device, where the first indication information is used to determine QCL configuration information corresponding to a target antenna port used for sending first data, the QCL
(Continued)

configuration information is used to indicate an antenna port that is QCLed with the corresponding target antenna port.

11 Claims, 4 Drawing Sheets

(51) Int. Cl.
*H04B 7/04* (2017.01)
*H04L 25/03* (2006.01)

(52) U.S. Cl.
CPC ...... *H04B 7/0486* (2013.01); *H04L 25/03929* (2013.01)

(56) References Cited

U.S. PATENT DOCUMENTS

| | | | |
|---|---|---|---|
| 2013/0114535 A1* | 5/2013 | Ng | H04L 5/0005 370/329 |
| 2013/0279437 A1* | 10/2013 | Ng | H04W 48/12 370/329 |
| 2014/0119266 A1 | 5/2014 | Ng et al. | |
| 2015/0304997 A1 | 10/2015 | Park et al. | |
| 2016/0223639 A1 | 8/2016 | Davydov et al. | |
| 2016/0248561 A1 | 8/2016 | Davydov et al. | |
| 2017/0353282 A1 | 12/2017 | Park et al. | |
| 2018/0062710 A1* | 3/2018 | Qian | H04B 7/04 |
| 2018/0287681 A1* | 10/2018 | Chen | H04W 72/04 |
| 2019/0159209 A1* | 5/2019 | Xiao | H04W 72/085 |
| 2019/0261329 A1* | 8/2019 | Park | H04B 7/08 |

OTHER PUBLICATIONS

Huawei et al., "Evaluation of the Impact of QCL Assumptions and Discussion on Potential QCL Configurations," 3GPP TSG RAN WG1 Meeting #86, Gothenburg, Sweden, Aug. 22-26, 2016, R1-167199, pp. 1-7.

Huawei et al., "Potential enhancements for non-coherent JT," 3GPP TSG RAN WG1 Meeting #86, Gothenburg, SE, Aug. 22-26, 2016, R1-167143 (5 pp.).

Qualcomm Incorporated, "Enhancements for Non-Coherent Joint Transmission," 3GPP TSG RAN WG1 #86, Aug. 22-26, 2016, Gothenburg, Sweden, R1-166317, pp. 1-6.

Intel et al., "WF on the antenna ports QCL in NR," 3GPP TSG-RAN1 Meeting #86, Gothenburg, Sweden, Aug. 22-26, 2016, R1-167970 (4 pp.).

3GPP TS 36.213 V13.3.0 (Sep. 2016), 3rd Generation Partnership Project; Technical Specification Group Radio Access Network; Evolved Universal Terrestrial Radio Access (E-UTRA); Physical layer procedures (Release 13), pp. 1-385.

3GPP TS 36.211 V14.0.0 (Sep. 2016), 3rd Generation Partnership Project; Technical Specification Group Radio Access Network; Evolved Universal Terrestrial Radio Access (E-UTRA); Physical channels and modulation (Release 14), pp. 1-170.

Office Action, dated Apr. 2, 2019, in Chinese Application No. 201610872741.8 (7 pp.).

Written Opinion of the International Searching Authority, dated Nov. 3, 2017, in International Application No. PCT/CN2017/101012 (7 pp.).

* cited by examiner

METHOD AND APPARATUS USED FOR DATA TRANSMISSION

CROSS-REFERENCE TO RELATED APPLICATIONS

This application is a continuation of International Application No. PCT/CN2017/101012, filed on Sep. 8, 2017, which claims priority to Chinese Patent Application No. 201610872741.8, filed on Sep. 30, 2016. The disclosures of the aforementioned applications are hereby incorporated by reference in their entireties.

TECHNICAL FIELD

This application relates to the communications field, and more specifically, to a method and an apparatus used for data transmission.

BACKGROUND

Coordinated multipoint (Coordination Multiple Point, CoMP) transmission/reception is a method that is proposed in Long Term Evolution (Long Term Evolution, LTE) and that is used for resolving an inter-cell interference problem and increasing a user throughput at a cell edge. To support CoMP, that is, to allow user equipment to receive a physical downlink control channel (Physical Downlink Control Channel, PDCCH) from a serving network device and receive a physical downlink shared channel (Physical Downlink Share Channel, PDSCH) from the serving network device or a cooperative network-side device (or both at the same time), a concept of antenna port quasi-co-location (Quasi-Co-Location, QCL) is introduced into LTE. A definition of antenna port quasi-co-location is that signals sent from quasi co-located antenna ports undergo same large-scale fading. Large-scale fading includes a delay spread, a Doppler spread, a Doppler shift, an average channel gain, and an average delay. A network-side device can transmit, through antenna ports meeting quasi-co-location, data to user equipment based on a mapping relationship between a code word and a layer and a mapping relationship between a layer and an antenna port in the prior art. However, if antenna ports of a plurality of network devices for coordinated transmission/reception do not meet QCL, accuracy of channel estimation and performance of data demodulation are affected.

In the prior art, a 2-bit (bit) PDSCH resource mapping and quasi-co-location indicator (PDSCH RE Mapping and Quasi-Co-Location Indicator, PQI) is used in a downlink control information (Downlink Control Information, DCI) 2D format to indicate parameter configuration information of reference signals (including, for example, a cell reference signal (Cell Reference Signal, CRS), a demodulation reference signal (Demodulation Reference Signal, DMRS), and a channel state information-reference signal (Channel State Information-Reference Signal, CSI-RS)) transmitted by antenna ports meeting QCL.

With introduction of 5G new radio (New Radio, NR), different antenna panels may be configured on a same network device, and antenna ports belonging to the different antenna panels may be non-QCLed. In other words, the antenna ports of the same network device may be non-QCLed. If a same code word (Code Word, CW) is mapped to non-QCLed antenna ports (for example, a port #7 and a port #9 that are non-QCLed), the foregoing PQI needs to be used to indicate a DMRS that is QCLed with the port #7 and a DMRS that is QCLed with the port #9. In this case, a quantity of bits of DCI needs to be extended, or more PQIs are used for indication. Therefore, this method for indicating QCL configuration information based on an antenna port is inflexible.

SUMMARY

Embodiments of this application provide a method and an apparatus used for data transmission, to group antenna ports; map at least one group of code words to be sent to a same terminal device to a group of antenna ports meeting QCL, to send data; and send, to the terminal device based on a mapping relationship between at least one group of code words and at least one group of target antenna ports, indication information used for determining QCL configuration information. This method is more applicable to coordinated transmission/reception in NR, and is relatively flexible.

According to a first aspect, a method used for data transmission is provided, including:

determining, by a network device, a plurality of groups of antenna ports, where each group of antenna ports includes two antenna ports, and any two antenna ports in a same group of antenna ports meet quasi-co-location QCL; and sending, by the network device, at least one piece of first indication information to a terminal device, where the first indication information is used to determine QCL configuration information corresponding to a target antenna port used for sending first data, the QCL configuration information is used to indicate an antenna port that is QCLed with the corresponding target antenna port, the first data is data obtained by mapping at least one group of code words to at least one group of target antenna ports, the at least one piece of first indication information is in a one-to-one correspondence with the at least one group of code words, and the at least one group of code words is in a one-to-one correspondence with the at least one group of target antenna ports.

It should be noted that, in two antenna ports meeting QCL, large-scale properties of a channel over which a symbol is transmitted through an antenna port may be inferred from large-scale properties of a channel over which a symbol is transmitted through another antenna port. The two antenna ports meeting QCL have the same large-scale properties. The large-scale properties may specifically include one or more of a delay spread, a Doppler spread, a Doppler shift, an average gain, and an average delay. However, it should be understood that the specific content that is included in the "large-scale properties" and that is listed herein is merely an example for description, and should not constitute any limitation on this application. This application does not exclude a possibility of modifying or extending the content included in the "large-scale properties" in future standards.

Therefore, antenna ports are grouped; at least one group of code words to be sent to a same terminal device is mapped to a group of antenna ports meeting QCL, to send data; and indication information is sent to the terminal device based on a mapping relationship between at least one group of code words and at least one group of target antenna ports, and is used by the terminal device to determine QCL configuration information used for demodulating the data. Compared with indication information sending based on an antenna port in the prior art, this method is more applicable to coordinated transmission/reception in NR, and is relatively flexible.

Optionally, the first data is data obtained by a transmit-end device by mapping the at least one group of code words to the at least one group of target antenna ports, and the transmit-end device is the same as or different from the network device.

It should be noted that a plurality of groups of antenna ports may be pre-configured for the transmit-end device by a controller or pre-configured by the transmit-end device itself. When data needs to be sent, one or more groups of the plurality of groups of antenna ports are used to send the data. Alternatively, when data needs to be sent, one or more groups of antenna ports may be configured to send the data. In other words, the plurality of groups of antenna ports configured on the network device may be static or may be dynamic. This is not particularly limited in this application.

It should be further noted that each group of antenna ports in this embodiment of this application may include at least two antenna ports, or may include only one antenna port. If a group of antenna ports (for example, denoted as an antenna port group #1) includes only one antenna port, the antenna port in the antenna port group #1 does not have a QCL relationship, but the antenna port group #1 and another group of antenna ports (for example, denoted as an antenna port group #2) may have a QCL or non-QCL relationship. If the antenna port group #2 includes at least two antenna ports, any two antenna ports in the antenna port group #2 meet a QCL relationship. A quantity of antenna ports included in each group of antenna ports is not particularly limited in this application.

With reference to the first aspect, in a first possible implementation of the first aspect, the sending, by the network device, at least one piece of first indication information to the terminal device includes:

sending, by the network device, first downlink control information DCI to the terminal device, where the first DCI includes the at least one piece of first indication information.

With reference to the first possible implementation of the first aspect, in a second possible implementation of the first aspect, the first indication information includes an index of a higher layer parameter, and the higher layer parameter is used to determine the QCL configuration information; and the sending, by the network device, first downlink control information DCI to the terminal device, where the first DCI includes the at least one piece of first indication information includes:

determining, by the network device based on a first mapping relationship, at least one set of target higher layer parameters corresponding to the at least one group of target antenna ports, where the first mapping relationship is used to indicate a mapping relationship between the plurality of groups of antenna ports and a plurality of sets of higher layer parameters;

determining, by the network device based on a second mapping relationship, at least one target information bit corresponding to an index of the at least one set of target higher layer parameters, where the second mapping relationship is used to indicate a mapping relationship between indexes of the plurality of sets of higher layer parameters and a plurality of information bits; and sending, by the network device, the first DCI, where the first DCI includes the at least one target information bit.

The at least one piece of first indication information is carried in the DCI, and indicates the index of the higher layer parameter, so that the terminal device determines a corresponding QCL configuration parameter based on the higher layer parameter. This is quite flexible and convenient, and is easy to implement.

With reference to the second possible implementation of the first aspect, in a third possible implementation of the first aspect, the sending, by the network device, the first DCI, where the first DCI includes the at least one target information bit include:

sending, by the network device, the first DCI, where the first DCI includes at least one indication field, and each indication field includes one target information bit; and the indication field is a field used for indicating a transport block TB, and the at least one indication field is in a one-to-one correspondence with at least one field used for indicating a TB; or the indication field is a field used for indicating a code word.

In other words, the at least one piece of first indication information may be carried by a field, used for indicating a TB, in DCI stipulated in an existing protocol (for example, an LTE protocol), or may be carried by a newly added field (for example, a field used for indicating a code word). This is not particularly limited in this application. Through carrying the at least one piece of first indication information by the field used for indicating a TB or the field used for indicating a code word, the one-to-one correspondence between the at least one group of code words and the at least one piece of first indication information may be distinguished by using different fields. This is quite flexible and convenient, and is easy to implement.

According to a second aspect, a method used for data transmission is provided, including: receiving, by a terminal device, first data, where the first data is data obtained by mapping at least one group of code words to at least one group of target antenna ports, the at least one group of code words is in a one-to-one correspondence with the at least one group of target antenna ports, each group of target antenna ports includes at least two antenna ports, and any two antenna ports in a same group of target antenna ports meet quasi-co-location QCL;

receiving, by the terminal device, at least one piece of first indication information sent by a network device, where the first indication information is used to determine at least one group of QCL configuration information corresponding to the target antenna port, the QCL configuration information is used to indicate an antenna port that is QCLed with the corresponding target antenna port, and the at least one piece of first indication information is in a one-to-one correspondence with the at least one group of code words; and demodulating, by the terminal device, the first data based on the at least one piece of first indication information.

In two antenna ports meeting QCL, large-scale properties of a channel over which a symbol is transmitted through an antenna port may be inferred from large-scale properties of a channel over which a symbol is transmitted through another antenna port. The two antenna ports meeting QCL have the same large-scale properties. The large-scale properties may specifically include one or more of a delay spread, a Doppler spread, a Doppler shift, an average gain, and an average delay. However, it should be understood that the specific content that is included in the "large-scale properties" and that is listed herein is merely an example for description, and should not constitute any limitation on this application. This application does not exclude a possibility of modifying or extending the content included in the "large-scale properties" in future standards.

Therefore, antenna ports are grouped; at least one group of code words to be sent to a same terminal device is mapped to a group of antenna ports meeting QCL, to send data; and indication information is sent to the terminal device based on a mapping relationship between at least one group of code words and at least one group of target antenna ports, and is used by the terminal device to determine QCL configuration information used for demodulating the data. Compared with indication information sending based on an antenna port in the prior art, this method is more applicable to coordinated transmission/reception in NR, and is relatively flexible.

With reference to the second aspect, in a first possible implementation of the second aspect, the receiving, by the terminal device, at least one piece of first indication information sent by a network device includes:

receiving, by the terminal device, first downlink control information DCI sent by the network device, where the first DCI includes the at least one piece of first indication information.

With reference to the first possible implementation of the second aspect, in a second possible implementation of the second aspect, the first indication information includes an index of a higher layer parameter; and the receiving, by the terminal device, first downlink control information DCI sent by the network device, where the first DCI includes the at least one piece of first indication information includes:

receiving, by the terminal device, the first DCI sent by the network device, where the first DCI includes at least one target information bit, and the at least one target information bit is in a one-to-one correspondence with an index of the at least one set of higher layer parameters.

The at least one piece of first indication information is carried in the DCI, and indicates the index of the higher layer parameter, so that the terminal device determines a corresponding QCL configuration parameter based on the higher layer parameter. This is quite flexible and convenient, and is easy to implement.

With reference to the second possible implementation of the second aspect, in a third possible implementation of the second aspect, the receiving, by the terminal device, the first DCI sent by the network device, where the first DCI includes at least one target information bit includes:

receiving, by the terminal device, the first DCI sent by the network device, where the first DCI includes at least one indication field, and each indication field includes one target information bit; and the indication field is a field used for indicating a transport block TB, and the at least one indication field is in a one-to-one correspondence with at least one field used for indicating a TB; or the indication field is a field used for indicating a code word.

In other words, the at least one piece of first indication information may be carried by a field, used for indicating a TB, in DCI stipulated in an existing protocol (for example, an LTE protocol), or may be carried by a newly added field (for example, a field used for indicating a code word). This is not particularly limited in this application. Through carrying the at least one piece of first indication information by the field used for indicating a TB or the field used for indicating a code word, the one-to-one correspondence between the at least one group of code words and the at least one piece of first indication information may be distinguished by using different fields. This is quite flexible and convenient, and is easy to implement.

With reference to the second or third possible implementation of the second aspect, in a fourth possible implementation of the second aspect, the demodulating, by the terminal device, the first data based on the at least one piece of first indication information includes:

determining, by the terminal device based on a second mapping relationship, at least one set of target higher layer parameters corresponding to the at least one target information bit, where the second mapping relationship is used to indicate a mapping relationship between indexes of a plurality of sets of higher layer parameters and a plurality of information bits;

determining, by the terminal device, the at least one piece of QCL configuration information based on the at least one set of target higher layer parameters; and demodulating, by the terminal device, the first data based on the at least one piece of QCL configuration information.

By demodulating the higher layer parameter indicated by the at least one piece of first indication information, the QCL configuration information used for demodulating the first data may be obtained.

According to a third aspect, a method used for data transmission is provided, including:

determining, by a network device, a plurality of groups of antenna ports, where each group of antenna ports includes two antenna ports, and any two antenna ports in a same group of antenna ports meet quasi-co-location QCL; and sending, by the network device, at least one piece of first indication information to a terminal device, where the first indication information is used to determine QCL configuration information corresponding to a target antenna port used for sending first data, the QCL configuration information is used to indicate that any two antenna ports in the corresponding group of target antenna ports meet QCL, the first data is data obtained by mapping at least one group of code words to at least one group of target antenna ports, the at least one piece of first indication information is in a one-to-one correspondence with the at least one group of code words, and the at least one group of code words is in a one-to-one correspondence with the at least one group of target antenna ports.

It should be noted that, in two antenna ports meeting QCL, large-scale properties of a channel over which a symbol is transmitted through an antenna port may be inferred from large-scale properties of a channel over which a symbol is transmitted through another antenna port. The two antenna ports meeting QCL have the same large-scale properties. The large-scale properties may specifically include one or more of a delay spread, a Doppler spread, a Doppler shift, an average gain, and an average delay. However, it should be understood that the specific content that is included in the "large-scale properties" and that is listed herein is merely an example for description, and should not constitute any limitation on this application. This application does not exclude a possibility of modifying or extending the content included in the "large-scale properties" in future standards.

Therefore, antenna ports are grouped; at least one group of code words to be sent to a same terminal device is mapped to a group of antenna ports meeting QCL, to send data; and indication information is sent to the terminal device based on a mapping relationship between at least one group of code words and at least one group of target antenna ports, and is used by the terminal device to determine QCL configuration information used for demodulating the data. Compared with indication information sending based on an antenna port in the prior art, this method is more applicable to coordinated transmission/reception in NR, and is relatively flexible.

Optionally, the first data is data obtained by a transmit-end device by mapping the at least one group of code words to the at least one group of target antenna ports, and the transmit-end device is the same as or different from the network device.

It should be noted that a plurality of groups of antenna ports may be pre-configured for the transmit-end device by a controller or pre-configured by the transmit-end device itself. When data needs to be sent, one or more groups of the plurality of groups of antenna ports are used to send the data. Alternatively, when data needs to be sent, one or more groups of antenna ports may be configured to send the data. In other words, the plurality of groups of antenna ports configured on the network device may be static or may be dynamic. This is not particularly limited in this application.

It should be further noted that each group of antenna ports in this embodiment of this application may include at least two antenna ports, or may include only one antenna port. If a group of antenna ports (for example, denoted as an antenna port group #1) includes only one antenna port, the antenna port in the antenna port group #1 does not have a QCL relationship, but the antenna port group #1 and another group of antenna ports (for example, denoted as an antenna port group #2) may have a QCL or non-QCL relationship. If the antenna port group #2 includes at least two antenna ports, any two antenna ports in the antenna port group #2 meet a QCL relationship. A quantity of antenna ports included in each group of antenna ports is not particularly limited in this application.

With reference to the third aspect, in a first possible implementation of the third aspect, the sending, by the network device, at least one piece of first indication information to the terminal device includes:

sending, by the network device, first downlink control information DCI to the terminal device, where the first DCI includes the at least one piece of first indication information.

With reference to the first possible implementation of the third aspect, in a second possible implementation of the third aspect, the first indication information includes an index of a higher layer parameter, and the higher layer parameter is used to determine the QCL configuration information; and the sending, by the network device, first downlink control information DCI to the terminal device, where the first DCI includes the at least one piece of first indication information includes:

determining, by the network device based on a first mapping relationship, at least one set of target higher layer parameters corresponding to the at least one group of target antenna ports, where the first mapping relationship is used to indicate a mapping relationship between the plurality of groups of antenna ports and a plurality of sets of higher layer parameters;

determining, by the network device based on a second mapping relationship, at least one target information bit corresponding to an index of the at least one set of target higher layer parameters, where the second mapping relationship is used to indicate a mapping relationship between indexes of the plurality of sets of higher layer parameters and a plurality of information bits; and sending, by the network device, the first DCI, where the first DCI includes the at least one target information bit.

The at least one piece of first indication information is carried in the DCI, and indicates the index of the higher layer parameter, so that the terminal device determines a corresponding QCL configuration parameter based on the higher layer parameter. This is quite flexible and convenient, and is easy to implement.

With reference to the second possible implementation of the third aspect, in a third possible implementation of the third aspect, the sending, by the network device, the first DCI, where the first DCI includes the at least one target information bit includes:

sending, by the network device, the first DCI, where the first DCI includes at least one indication field, and each indication field includes one target information bit; and the indication field is a field used for indicating a transport block TB, and the at least one indication field is in a one-to-one correspondence with at least one field used for indicating a TB; or the indication field is a field used for indicating a code word.

In other words, the at least one piece of first indication information may be carried by a field, used for indicating a TB, in DCI stipulated in an existing protocol (for example, an LTE protocol), or may be carried by a newly added field (for example, a field used for indicating a code word). This is not particularly limited in this application. Through carrying the at least one piece of first indication information by the field used for indicating a TB or the field used for indicating a code word, the one-to-one correspondence between the at least one group of code words and the at least one piece of first indication information may be distinguished by using different fields. This is quite flexible and convenient, and is easy to implement.

According to a fourth aspect, a method used for data transmission is provided, including: receiving, by a terminal device, first data, where the first data is data obtained by mapping at least one group of code words to at least one group of target antenna ports, the at least one group of code words is in a one-to-one correspondence with the at least one group of target antenna ports, each group of target antenna ports includes at least two antenna ports, and any two antenna ports in a same group of target antenna ports meet quasi-co-location QCL;

receiving, by the terminal device, at least one piece of first indication information sent by a network device, where the first indication information is used to determine at least one group of QCL configuration information corresponding to the target antenna port, the QCL configuration information is used to indicate that any two antenna ports in the corresponding group of target antenna ports meet QCL, and the at least one piece of first indication information is in a one-to-one correspondence with the at least one group of code words; and demodulating, by the terminal device, the first data based on the at least one piece of first indication information.

In two antenna ports meeting QCL, large-scale properties of a channel over which a symbol is transmitted through an antenna port may be inferred from large-scale properties of a channel over which a symbol is transmitted through another antenna port. The two antenna ports meeting QCL have the same large-scale properties. The large-scale properties may specifically include one or more of a delay spread, a Doppler spread, a Doppler shift, an average gain, and an average delay. However, it should be understood that the specific content that is included in the "large-scale properties" and that is listed herein is merely an example for description, and should not constitute any limitation on this application. This application does not exclude a possibility of modifying or extending the content included in the "large-scale properties" in future standards.

Therefore, antenna ports are grouped; at least one group of code words to be sent to a same terminal device is mapped to a group of antenna ports meeting QCL, to send data; and indication information is sent to the terminal device based on a mapping relationship between at least one group of code words and at least one group of target antenna ports, and is used by the terminal device to determine QCL configuration information used for demodulating the data. Compared with indication information sending based on an antenna port in the prior art, this method is more applicable to coordinated transmission/reception in NR, and is relatively flexible.

With reference to the fourth aspect, in a first possible implementation of the fourth aspect, the receiving, by the terminal device, at least one piece of first indication information sent by a network device includes:

receiving, by the terminal device, first downlink control information DCI sent by the network device, where the first DCI includes the at least one piece of first indication information.

With reference to the first possible implementation of the fourth aspect, in a second possible implementation of the fourth aspect, the first indication information includes an index of a higher layer parameter; and the receiving, by the terminal device, first downlink control information DCI sent by the network device, where the first DCI includes the at least one piece of first indication information includes:

receiving, by the terminal device, the first DCI sent by the network device, where the first DCI includes at least one target information bit, and the at least one target information bit is in a one-to-one correspondence with an index of the at least one set of higher layer parameters.

The at least one piece of first indication information is carried in the DCI, and indicates the index of the higher layer parameter, so that the terminal device determines a corresponding QCL configuration parameter based on the higher layer parameter. This is quite flexible and convenient, and is easy to implement.

With reference to the second possible implementation of the fourth aspect, in a third possible implementation of the fourth aspect, the receiving, by the terminal device, the first DCI sent by the network device, where the first DCI includes at least one target information bit includes:

receiving, by the terminal device, the first DCI sent by the network device, where the first DCI includes at least one indication field, and each indication field includes one target information bit; and the indication field is a field used for indicating a transport block TB, and the at least one indication field is in a one-to-one correspondence with at least one field used for indicating a TB; or the indication field is a field used for indicating a code word.

In other words, the at least one piece of first indication information may be carried by a field, used for indicating a TB, in DCI stipulated in an existing protocol (for example, an LTE protocol), or may be carried by a newly added field (for example, a field used for indicating a code word). This is not particularly limited in this application. Through carrying the at least one piece of first indication information by the field used for indicating a TB or the field used for indicating a code word, the one-to-one correspondence between the at least one group of code words and the at least one piece of first indication information may be distinguished by using different fields. This is quite flexible and convenient, and is easy to implement.

With reference to the second or third possible implementation of the fourth aspect, in a fourth possible implementation of the fourth aspect, the demodulating, by the terminal device, the first data based on the at least one piece of first indication information includes:

determining, by the terminal device based on a second mapping relationship, at least one set of target higher layer parameters corresponding to the at least one target information bit, where the second mapping relationship is used to indicate a mapping relationship between indexes of a plurality of sets of higher layer parameters and a plurality of information bits;

determining, by the terminal device, the at least one piece of QCL configuration information based on the at least one set of target higher layer parameters; and demodulating, by the terminal device, the first data based on the at least one piece of QCL configuration information.

By demodulating the higher layer parameter indicated by the at least one piece of first indication information, the QCL configuration information used for demodulating the first data may be obtained.

According to a fifth aspect, a method used for data transmission is provided, including:

determining, by a network device, a plurality of groups of antenna ports, where each group of antenna ports includes at least one antenna port, and if an $i^{th}$ group of antenna ports in the at least one group of antenna ports includes at least two antenna ports, any two antenna ports in the $i^{th}$ group of antenna ports meet QCL, where $i \in [1, N]$, N represents a quantity of groups of antenna ports, and N is a natural number greater than or equal to 1; and sending, by the network device, second indication information to the terminal device, where the second indication information is used to indicate whether two groups of target antenna ports used for sending second data meet QCL, the second data is data obtained by mapping two groups of code words to the two groups of target antenna ports, and the two groups of code words are in a one-to-one correspondence with the two groups of target antenna ports.

The two groups of code words are mapped to the two groups of antenna ports, respectively, and the second indication information indicates whether the two groups of target antenna ports meet QCL, so as to determine whether to separately demodulate or simultaneously demodulate data corresponding to the two groups of code words. In this case, the network device may not send indication information of a higher layer parameter (that is, the first indication information described in the first aspect or the second aspect) to the terminal device, but directly uses 1 bit to indicate a QCL relationship between the two groups of target antenna ports, and uses pilot information that is included in existing DCI and that is used for data demodulation, to demodulate the data. Compared with 2-bit PQI indication information in the prior art, 1-bit overheads are reduced, and this method is also quite flexible and convenient.

With reference to the fifth aspect, in a first possible implementation of the fifth aspect, the sending, by the network device, second indication information to the terminal device includes:

sending, by the network device, second downlink control information DCI to the terminal device, where the second DCI includes the second indication information.

It can be understood that the method provided in the fifth aspect may be implemented independently of the method provided in the first aspect or the third aspect, or may be combined, based on a requirement, with the method provided in the first aspect or the third aspect. Details are not described herein.

According to a sixth aspect, a method used for data transmission is provided, including:

receiving, by a terminal device, second data, where the second data is data obtained by mapping two groups of code words to the two groups of target antenna ports, the two groups of code words are in a one-to-one correspondence with the two groups of target antenna ports, each group of target antenna ports includes at least one antenna port, and if an $i^{th}$ group of target antenna ports in the at least one group of target antenna ports includes at least two antenna ports, any two antenna ports in the $i^{th}$ group of target antenna ports meet quasi-co-location QCL, where $i \in [1, M]$, M represents a quantity of groups of target antenna ports, and M is a natural number greater than or equal to 1;

receiving, by the terminal device, second indication information sent by a network device, where the second indication information is used to indicate whether the two groups of target antenna ports meet QCL; and demodulating, by the terminal device, the second data based on the second indication information.

The two groups of code words are mapped to the two groups of antenna ports, respectively, and the second indication information indicates whether the two groups of target antenna ports meet QCL, so as to determine whether to separately demodulate or simultaneously demodulate data corresponding to the two groups of code words. In this case, the network device may not send indication information of a higher layer parameter (that is, the first indication information described in the first aspect or the second aspect) to the terminal device, but directly uses 1 bit to indicate a QCL relationship between the two groups of target antenna ports, and uses pilot information that is included in existing DCI and that is used for data demodulation, to demodulate the data. Compared with 2-bit PQI indication information in the prior art, 1-bit overheads are reduced, and this method is also quite flexible and convenient.

With reference to the sixth aspect, in a first possible implementation of the sixth aspect, the receiving, by the terminal device, second indication information sent by a network device includes:

receiving, by the terminal device, second downlink control information DCI sent by the network device, where the second DCI includes the second indication information.

It can be understood that the method provided in the sixth aspect may be implemented independently of the method provided in the second aspect or the fourth aspect, or may be combined, based on a requirement, with the method provided in the second aspect or the fourth aspect. Details are not described herein.

According a seventh aspect, a network device is provided, and is configured to perform the method in any one of the first aspect or the possible implementations of the first aspect, any one of the third aspect or the possible implementations of the third aspect, or any one of the fifth aspect or the possible implementations of the fifth aspect. Specifically, the terminal device may include a unit configured to perform the method in any one of the first aspect or the possible implementations of the first aspect, any one of the third aspect or the possible implementations of the third aspect, or any one of the fifth aspect or the possible implementations of the fifth aspect.

According an eighth aspect, a terminal device is provided, and is configured to perform the method in any one of the second aspect or the possible implementations of the second aspect, any one of the fourth aspect or the possible implementations of the fourth aspect, or any one of the sixth aspect or the possible implementations of the sixth aspect. Specifically, the terminal device may include a unit configured to perform the method in any one of the second aspect or the possible implementations of the second aspect, any one of the fourth aspect or the possible implementations of the fourth aspect, or any one of the sixth aspect or the possible implementations of the sixth aspect.

According to a ninth aspect, a network device is provided, and includes a memory and a processor. The memory is configured to store an instruction. The processor is configured to execute the instruction stored in the memory, and executing the instruction stored in the memory enables the processor to perform the method in any one of the first aspect or the possible implementations of the first aspect, any one of the third aspect or the possible implementations of the third aspect, or any one of the fifth aspect or the possible implementations of the fifth aspect.

According to a tenth aspect, a terminal device is provided, and includes a memory and a processor. The memory is configured to store an instruction. The processor is configured to execute the instruction stored in the memory, and executing the instruction stored in the memory enables the processor to perform the method in any one of the second aspect or the possible implementations of the second aspect, any one of the fourth aspect or the possible implementations of the fourth aspect, or any one of the sixth aspect or the possible implementations of the sixth aspect.

According to an eleventh aspect, a computer-readable storage medium is provided, and is configured to store a computer program. The computer program includes an instruction used to perform any method in any one of the first to the sixth aspect or the possible implementations of the first to the sixth aspect.

In some of the foregoing possible implementations, the first mapping relationship and the second mapping relationship may be pre-configured through negotiation between the network device and the terminal device, or may be sent from the network device to the terminal device. This is not particularly limited in this application.

Based on the foregoing technical solutions, in the embodiments of this application, antenna ports are grouped; at least one group of code words to be sent to a same terminal device is mapped to a group of antenna ports meeting QCL, to send data; and indication information used for determining QCL configuration information is sent to the terminal device based on a mapping relationship between at least one group of code words and at least one group of target antenna ports. This method is more applicable to coordinated transmission/reception in NR, and is relatively flexible.

DESCRIPTION OF EMBODIMENTS

The following describes technical solutions of this application with reference to accompanying drawings.

It should be understood that the technical solutions of this application may be applied to various communications systems, such as a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, a Long Term Evolution Advanced (Advanced long term evolution, LTE-A) system, a Universal Mobile Telecommunications System (Universal Mobile Telecommunication System, UMTS), and a 5G system.

Figure 1:
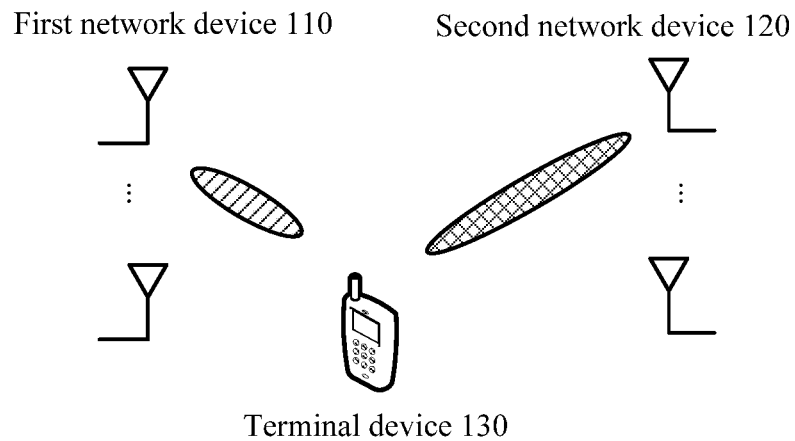
FIG. 1 is a schematic diagram of a wireless communications system applicable to an embodiment of this application.

FIG. 1 is a wireless communications system 100 applicable to an embodiment of this application. The wireless communications system 100 may include at least one network device, for example, a first network device 110 and a second network device 120 that are shown in FIG. 1. Both the first network device 110 and the second network device 120 may communicate with a terminal device 130 through a wireless air interface. The first network device 110 and the second network device 120 may provide communication coverage for a particular geographical area, and may communicate with a terminal device located in this coverage area. The first network device 110 or the second network device 120 may be a base transceiver station (Base Transceiver Station, BTS) in a GSM system or a CDMA system, or may be a NodeB (NodeB) in a WCDMA system, or may be an evolved NodeB (Evolutional Node B, eNB or eNodeB) in an LTE system, or a network device in a future 5G network, for example, a transmission/reception point (Transmission/Reception Point, TRP), a base station, or a small base station device. This is not particularly limited in this embodiment of this application.

The wireless communications system 100 further includes one or more terminal devices (User Equipment, UE) 130 located in the coverage of the first network device 110 and the second network device 120. The terminal device 130 may be mobile or fixed. The terminal device 130 may communicate with one or more core networks (Core Network) by using a radio access network (Radio Access Network, RAN). The terminal device may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device with a wireless communication function, a computing device, another processing device connected to a wireless modem, an in-vehicle device, a wearable device, a terminal device in a future 5G network, or the like.

The wireless communications system 100 can support coordinated multipoint (CoMP) transmission/reception, or in other words, a plurality of cells or a plurality of transmission/reception points may coordinate with each other to send data to a same terminal device on a same time-frequency resource. The plurality of cells may belong to a same network device or different network devices, and may be selected based on a channel gain, a path loss, received signal strength, a received signal instruction, or the like. An antenna port set of any two transmission/reception points in the plurality of transmission/reception points may not have same large-scale properties, that is, the antenna port set of the two transmission/reception points is non-QCLed (or does not meet QCL). In addition, the two transmission/reception points may belong to a same cell or belong to different cells, and this is not limited in this embodiment of this application. For the same large-scale properties, refer to a definition in a 3rd Generation Partnership Project ($3^{rd}$ Generation Partnership Project, 3GPP) standard, or the same large-scale properties may be set based on an actual system requirement. The definition in the current 3GPP standard is as follows: In two antenna ports meeting QCL, large-scale properties of a channel over which a symbol is transmitted through an antenna port may be inferred from large-scale properties of a channel over which a symbol is transmitted through another antenna port. For the "large-scale properties", refer to a definition in the 3GPP standard, or the large-scale properties may be set based on an actual system requirement. In the current 3GPP standard, the "large-scale properties" may include one or more of a delay spread, a Doppler spread, a Doppler shift, an average gain, and an average delay. However, it should be understood that the specific content that is included in the "large-scale properties" and that is listed herein is merely an example for description, and should not constitute any limitation on this application. This application does not exclude a possibility of modifying or extending the content included in the "large-scale properties" in future standards.

The first network device and the second network device in this embodiment of this application may be QCLed (or meet a QCL relationship) or may be non-QCLed (or does not meet a QCL relationship). Two network devices that meet a QCL relationship may be network devices belonging to a same site or may be network devices belonging to different sites. Two network devices that do not meet a QCL relationship may be non-QCLed network devices belonging to a same site, for example, radio frequency units that belong to a same base station and whose geographical locations are relatively far away from each other, or different antenna panels are configured on the same base station, and antenna ports belonging to the different antenna panels of the same base station may be non-QCLed. Two network devices that do not meet a QCL relationship may alternatively be non-QCLed network devices belonging to different sites. This is not particularly limited in this embodiment of this application.

The terminal device 130 in the wireless communications system 100 can support multipoint transmission/reception. To be specific, the terminal device 130 may communicate with the first network device 110, or may communicate with the second network device 120. The first network device 110 may serve as a serving network device. A serving network device is a network device that provides services such as an RRC connection, non-access stratum (Non-access Stratum, NAS) mobility management, and secure input to a terminal device by using a wireless air interface protocol.

Optionally, the first network device may be a serving network device, and the second network device may be a cooperative network device; or the first network device may be a cooperative network device, and the second network device may be a serving network device. The serving network device may send control signaling to the terminal device, and the cooperative network device may send data to the terminal device; or the serving network device may send control signaling to the terminal device, and the serving network device and the cooperative network device may simultaneously send data to the terminal device. This is not particularly limited in this embodiment of this application.

An example in which the first network device is a serving network device and the second network device is a cooperative network device is used. There may be one or more second network devices, and the second network device and the first network device are network devices that meet different QCL assumptions. It can be understood that both the first network device and the second network device may be serving network devices, for example, both the first network device and the second network device may be serving network devices in a non-cell non-cell scenario.

For easy understanding of embodiments of this application, a mapping relationship between a code word, a layer, and an antenna port is briefly described first before methods used for data transmission in the embodiments of this application are described.

User-plane data and a signaling message need to be processed by a Packet Data Convergence Protocol (Packet Data Convergence Protocol, PDCP) layer, a Radio Link Control (Radio Link Control, RLC) layer, or a Media Access Control (Media Access Control, MAC) layer before being sent through an air interface at a physical layer. Data processed at the physical layer is a protocol data unit (Protocol Data Unit, PDU) of the MAC layer, that is, a data flow. A code word is obtained by performing channel coding on a data flow from an upper layer. Different code words are used to distinguish different data flows. Because a quantity of code words is different from a quantity of transmit antennas, and code words may be mapped to different transmit antennas, layer mapping and precoding need to be performed. Layer mapping may be understood as remapping code words to a plurality of layers according to a specific rule; and precoding may be understood as mapping data that is mapped to a plurality of layers to different antenna ports.

A network device encodes data to obtain a code word, maps the code word to a layer, then maps the layer to an antenna port, and sends a data signal to a terminal device through the corresponding antenna port; and sends a demodulation reference signal through the corresponding antenna port, so that the terminal device performs demodulation processing on the received data based on the demodulation reference signal to obtain raw data.

It should be noted that an antenna port may be understood as a transmit antenna that may be identified by a receive-end device, or a transmit antenna that may be distinguished in space. An antenna port may be defined based on a reference signal (or a pilot signal) associated with the antenna port. An antenna port may be one physical antenna on a transmit-end device, or may be a weighted combination of a plurality of physical antennas on a transmit-end device. Unless otherwise specified, one antenna port is corresponding to one reference signal in this embodiment of this application.

It should be further noted that, in this embodiment of this application, an antenna port (or referred to as a port for short) may be understood as a reference signal port, and one reference signal is corresponding to one antenna port. In this embodiment of this application, an antenna port may include at least one type of, for example, a CRS port, a CSI-RS port, and a DMRS port. A CRS and a CSI-RS may be used for channel sounding, and a DMRS may be used for data demodulation. Reference signals of different types are used to implement different functions. An antenna port in this application may be a CSI-RS port or a CRS port, or may be a DMRS port. A person skilled in the art may understand a meaning of the antenna port.

Figure 2:
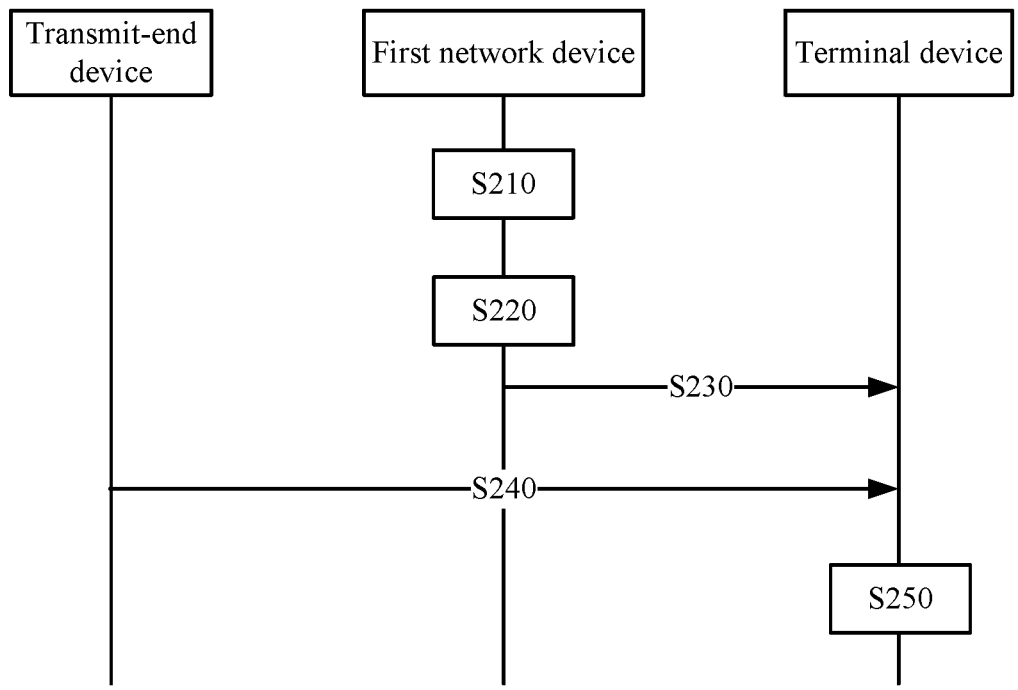
FIG. 2 is a schematic flowchart of a method used for data transmission according to an embodiment of this application.
Figure 3:
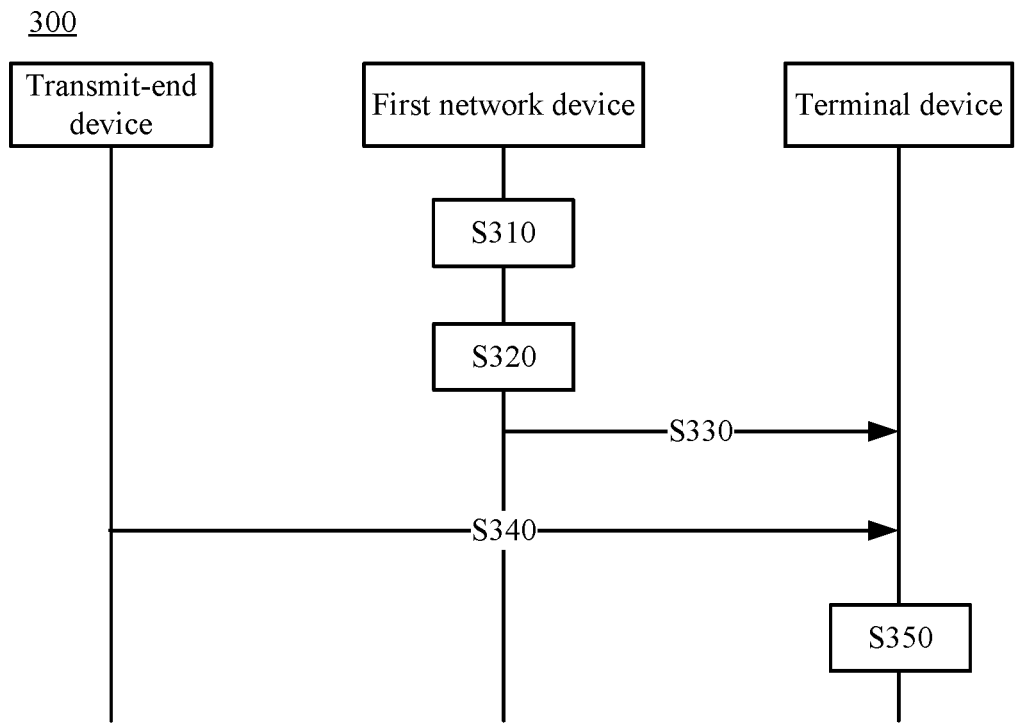
FIG. 3 is a schematic flowchart of a method used for data transmission according to another embodiment of this application.

With reference to FIG. 2 and FIG. 3, the following describes in detail the methods used for data transmission according to embodiments of this application.

It should be understood that FIG. 2 and FIG. 3 are schematic flowcharts of the methods used for data transmission in the embodiments of this application, and show detailed communication steps or operations of the methods. However, these steps or operations are merely an example, and other operations or variations of the operations in FIG. 2 or FIG. 3 may also be performed in the embodiments of this application. In addition, the steps in FIG. 2 and FIG. 3 may be performed respectively in sequences different from those presented in FIG. 2 and FIG. 3, and possibly not all operations in FIG. 2 and FIG. 3 need to be performed.

FIG. 2 is a schematic flowchart of a method 200, described from a perspective of device interaction, used for data transmission according to an embodiment of this application. The method 200 may be used for a communications system that uses a wireless air interface for communication. The communications system may include at least one network device and at least one terminal device. For example, the communications system may be the wireless communications system 100 shown in FIG. 1.

Optionally, the network device may be a transmission/reception point (TRP) or a base station, or may be another network device used for downlink control information (Downlink Control Information, DCI). This is not particularly limited in this application.

Without loss of generality, the following describes the method 200 in detail by using interaction between a first network device (denoted as the first network device for ease of differentiation and description) and a terminal device as an example. It should be understood that the first network device may be any network device that may serve as a serving network device and that is in the foregoing at least one network device. "First" is used only for differentiation and description, but should not constitute any limitation on this application. It should be further understood that the terminal device may be connected to and communicate with the first network device, and may further perform data communication with one or more other network devices (for example, a second network device). This is not particularly limited in this application.

As shown in FIG. 2, the method 200 includes the following steps.

S210: The first network device determines a plurality of groups of antenna ports.

It can be learned from the foregoing description that, in a communications system, at least one antenna port may be configured on each network device, and antenna ports configured on the network devices have a QCL or non-QCL relationship. In this embodiment of this application, for ease of description, at least two antenna ports meeting QCL are defined as a group of antenna ports (or an antenna port group).

Optionally, each group of antenna ports includes a DMRS port and a CRS port, or each group of antenna ports includes a DMRS port and a CSI-RS port.

Specifically, one or more antenna ports may be configured on a network device.

When one antenna port is configured on the network device (for example, denoted as a network device #1), this antenna port and an antenna port that is configured on another network device (for example, denoted as a network device #2) may be non-QCLed. In this case, the antenna port of the network device #1 may be determined as a group of antenna ports. This antenna port and an antenna port that is configured on another network device (for example, denoted as a network device #2) may alternatively be QCL. In this case, the antenna port of the network device #1 and the antenna port that is QCLed with the antenna port of the network device #1 may be determined as a group of antenna ports.

When a plurality of antenna ports are configured on a network device (for example, denoted as a network device #3), the plurality of antenna ports may be QCLed or may be non-QCLed. For example, when one antenna panel is configured on the network device #3, any two antenna ports on the antenna panel may be QCLed. In this case, a plurality of antenna ports on the antenna panel may be determined as a group of antenna ports. When a plurality of antenna panels are configured on the network device #3, any two antenna ports on a same antenna panel may be QCLed, and antenna ports on each antenna panel may be determined as a group of antenna ports. Antenna ports on any two different antenna panels (for example, any antenna port on an antenna panel #1 and any antenna port on an antenna panel #2) may be non-QCLed.

In other words, it is assumed that N (N is a natural number greater than or equal to 1) groups of antenna ports are configured on a network device in the communications system. If an $i^{th}$ group of antenna ports in the N groups of antenna ports includes a plurality of antenna ports, any two antenna ports in the $i^{th}$ group of antenna ports are QCLed, and antenna ports in different groups are non-QCLed, where $i \in [1, N]$ and i is a natural number.

In this embodiment of this application, if there are at least two antenna ports in a group of antenna ports, QCL configuration information needs to be indicated for the terminal device. The QCL configuration information may be understood as information used to indicate which antenna ports are antenna ports in a same group, or which antenna ports meet QCL, so that the terminal device demodulates data based on the QCL configuration information. According to the method 200 in this embodiment of this application, indication information used for determining the QCL configuration information is sent to the terminal device. In the method 200, each group of antenna ports may include at least two antenna ports unless otherwise specified.

It should be noted that two types (a type A (Type-A) and a type B (Type-B)) of QCL configuration are defined in an existing LTE protocol. The type-A defines a QCL configuration of one site (TRP), that is, antenna ports (including a CRS port, a DMRS port, and a CSI-RS port) of the site meet QCL. The type-B defines a QCL configuration between a plurality of sites, and a QCL configuration between antenna ports (including a CRS port, a DMRS port, and a CSI-RS port) of the plurality of sites may be indicated by a PQI (2 bits) in DCI.

In this embodiment of this application, the type-A may be corresponding to a case of a same antenna panel of a same network device in NR, the type-B may be corresponding to a case of different antenna panels of a same network device in NR, and a case of different network devices in NR.

In this embodiment of this application, the first network device may determine the plurality of groups of antenna ports by using the following two methods.

In a possible implementation, each network device may obtain information about a QCL relationship (that is, whether QCL is met) between antenna ports configured for the network device, and send the information about the QCL relationship between the antenna ports of the network device to a serving network device (for example, the first network device in this embodiment of this application) through an interface (for example, an X2 interface) between the network devices.

In another possible implementation, each network device may be controlled by a centralized controller. The controller may communicate with each network by using an optical fiber. A QCL configuration between antenna ports of the network devices may be completed by a higher layer and delivered to the controller by using radio resource control (Radio Resource Control, RRC) signaling. Then, the controller performs configuration of resource scheduling and data transmission for the network devices. In addition, the controller may send information about a QCL relationship between antenna ports configured on each network device to a serving network device (for example, the first network device in this embodiment of this application).

In this way, the first network device may determine a QCL relationship between the antenna ports in the communications system.

It should be understood that the foregoing two listed methods for obtaining the QCL relationship between the antenna ports by the first network device are merely examples for description, and should not constitute any limitation on this application. This application should not be limited thereto. It should be further understood that the first network device may be a serving network device of the terminal device, or may be a cooperative network device of the terminal device. This is not particularly limited in this application.

It should be noted that, in this embodiment of this application, a plurality of groups of antenna ports may be pre-configured on a network device (for example, the foregoing controller or the network devices). When data needs to be sent, one or more groups of the plurality of groups of antenna ports are used to send the data. Alternatively, when data needs to be sent, one or more groups of antenna ports may be configured on a network device to send the data. In other words, the plurality of groups of antenna ports configured on the network device may be static or may be dynamic. This is not particularly limited in this application.

S220: The first network device determines at least one group of target antenna ports used for sending first data.

Corresponding to the description in S210, in a possible implementation, each network device may perform configuration of resource scheduling and data transmission by using the serving network device (for example, the serving network device may be the first network device in this embodiment of this application). In this case, the serving network device may determine the at least one group of target antenna ports used for sending the first data.

Alternatively, each network device itself may perform configuration of resource scheduling and data transmission. In this case, the network devices need to coordinate resources for data transmission, and send, to the first network device through an interface (for example, an X2 interface) between the network devices, the at least one group of target antenna ports used for sending the first data.

In this embodiment of this application, for ease of differentiation and description, an antenna port used for sending the first data may be denoted as a target antenna port. The target antenna port used for sending the first data may be, for example, a DMRS port. A DMRS may be used for channel estimation and data demodulation.

A network device used for sending the first data may include the first network device, or may include another network device. Alternatively, a transmit-end device and the first network device may be a same device, or may be different devices.

It should be noted herein that, if a plurality of antenna panels are configured on a network device, the antenna panels do not need to exchange information through an interface.

In another possible implementation, the controller may determine a transmit-end device that sends the first data (for ease of understanding and differentiation, data to be sent to the terminal device is denoted as the first data) to the terminal device. In other words, the controller may determine which data is to be sent to the terminal device through which network devices. Specifically, the transmit-end device used for sending the first data to the terminal device may be the foregoing first network device, or may be another network device (for example, the second network device), or may be the foregoing first network device and another network device. In other words, the transmit-end device and the first network device may be a same device, or may be different devices. This is not particularly limited in this application.

It should be understood that the method for performing configuration of resource scheduling and data transmission for the network devices by the controller is merely an example for description, and should not constitute any limitation on this application. This application should not be limited thereto. For example, each network device may alternatively perform configuration of resource scheduling and data transmission by using the serving network device, or each network device itself may alternatively perform configuration of resource scheduling and data transmission.

In this embodiment of this application, the first data may be data obtained by the transmit-end device by mapping at least one group of code words to the at least one group of target antenna ports. Herein, the at least one group of code words is corresponding to the at least one group of target antenna ports, and each group of code words is mapped to a corresponding group of target antenna ports. Then, the first data is sent to the terminal device through the at least one group of target antenna ports.

The at least one group of target antenna ports may be one group of the plurality of groups of antenna ports determined in S210 or a part of antenna ports in the plurality of groups of antenna ports. Assuming that a quantity of groups of target antenna ports is M, M is a natural number less than or equal to N.

Then, the first network device may obtain, by using the controller (when configuration of resource scheduling and data transmission is performed by the controller) or an interface between the first network device and another network device (when configuration of resource scheduling and data transmission is performed by the network device itself), information about the at least one group of target antenna ports used for sending the first data, and generate, based on the information about the at least one group of target antenna ports, at least one piece of indication information (for example, first indication information described in the following) used to be sent to the terminal device, so that the terminal device demodulates the first data based on the received at least one piece of indication information.

S230: The first network device sends at least one piece of first indication information to the terminal device.

In a possible implementation, the first indication information may be included in DCI (denoted as first DCI for ease of differentiation and description) sent by the first network device to the terminal device.

Optionally, S230 may specifically include:
The first network device sends the first DCI to the terminal device, where the first DCI includes the at least one piece of first indication information.

Specifically, the first network device may use different information bits in indication fields in the DCI (denoted as the first DCI for ease of differentiation and description) sent to the terminal device, to indicate different QCL configuration information.

In this embodiment of this application, the at least one piece of first indication information is corresponding to the at least one group of code words. Each piece of first indication information is used to determine at least one piece of pilot information corresponding to the at least one group of target antenna ports used for sending the first data. The at least one piece of pilot information is corresponding to the at least one group of target antenna ports. Each piece of pilot information is used to demodulate data that is sent through a corresponding group of target antenna ports.

Optionally, the first indication information includes an index of a higher layer parameter, and the higher layer parameter is used to determine the QCL configuration information.

Each group of QCL configuration information is used to indicate that antenna ports in a corresponding group of antenna ports meet QCL. In other words, when obtaining the foregoing QCL configuration information, the terminal device may determine, based on specific content included in the QCL configuration information, which antenna ports belong to a same group of antenna ports, that is, determine which antenna ports meet QCL.

S230 may further include:
That the first network device sends the first downlink control information DCI to the terminal device, where the first DCI includes the at least one piece of first indication information includes:

the first network device determines, based on a first mapping relationship, at least one set of target higher layer parameters (higher layer parameter) corresponding to the at least one group of target antenna ports, where the first mapping relationship is used to indicate a mapping relationship between the plurality of groups of antenna ports and a plurality of sets of higher layer parameters;

the first network device determines, based on a second mapping relationship, at least one target information bit corresponding to an index of the at least one set of target higher layer parameters, where the second mapping relationship is used to indicate a mapping relationship between indexes of the plurality of sets of higher layer parameters and a plurality of information bits; and the first network device sends the first DCI, where the first DCI includes the at least one target information bit.

In other words, the first mapping relationship and the second mapping relationship may be pre-configured in the first network device. After the at least one group of target antenna ports for sending the first data is determined according to S220, the corresponding at least one set of target higher layer parameters may be determined based on the first mapping relationship. The at least one information bit corresponding to the at least one set of target higher layer parameters is carried in at least one indication field of the first DCI based on the second mapping relationship.

A higher layer parameter may be understood as a parameter that is configured by a higher layer and that is delivered by using RRC signaling. The higher layer parameter may include the following content:

1. CRS configuration (including a port and a frequency offset of a CRS);
2. PDSCH start point;
3. subframe configuration for a multicast/multicast single frequency network (Multimedia Broadcast Multicast Service Single Frequency Network, MBSFN);
4. non-zero power CSI-RS configuration;
5. configuration of a pilot for beam management (RS for beam management);
6. port number of an antenna port used for sending data;
7. scrambling identity (scrambling identity); and
8. mapping relationship between a code word and a layer.

The CRS configuration, the PDSCH start point, and the MBSFN are used to determine pilot information required for PDSCH resource element (Resource Element, RE) mapping (Mapping), and the non-zero power CSI-RS configuration and the configuration of a pilot for beam management may be used to determine the QCL configuration information. The port number of an antenna port used for sending data, the scrambling identity, and the mapping relationship between a code word and a layer are carried in DCI sent by a network device to a terminal device in the prior art, and may be represented by a higher layer parameter in this embodiment of this application.

It should be understood that the foregoing listed higher layer parameters used for determining the pilot information required for PDSCH RE mapping, the higher layer parameters used for determining the QCL configuration information, and the foregoing listed specific content included in the higher layer parameter are merely examples for description, and should not constitute any limitation on this application. This application does not exclude a possibility of deleting, modifying, or extending the specific content of the higher layer parameter in future standards. For example, a higher layer parameter used for determining the QCL configuration information may include only the non-zero power CSI-RS configuration.

Table 1 shows an example of a mapping relationship (that is, the second mapping relationship) between a plurality of information bits and indexes of a plurality of sets of higher layer parameters.

TABLE 1

| Information bit | Index of a higher layer parameter |
|---|---|
| 00 | 1 |
| 01 | 2 |
| 10 | 3 |
| 11 | 4 |

It can be learned that a bit sequence of 2 bits may indicate indexes of four sets of higher layer parameters. However, it should be understood that this should not constitute any limitation on this application, and this application does not exclude a possibility of using a bit sequence of more or fewer bits to indicate more or fewer sets of higher layer parameters. It can be understood that when a quantity of sets of higher layer parameters is L, a quantity of bits of an information bit used for indicating a higher layer parameter may be $n = \lceil \log_2 L \rceil$, where $\lceil \; \rceil$ represents an operation of rounding up to an integer.

It should be noted that a one-to-one correspondence between the plurality of sets of higher layer parameters and the indexes is pre-configured in the first network device and the terminal device. When the first network device indicates an index of a higher layer parameter to the terminal device, the terminal device may determine, based on the index, the target higher layer parameter indicated by the first network device.

Further, in S230, that the first network device sends the first DCI, where the first DCI includes the at least one target information bit may specifically include:

the first network device sends the first DCI, where the first DCI includes the at least one indication field, and each indication field includes one target information bit; and the indication field is a field used for indicating a transport block TB, and the at least one indication field is in a one-to-one correspondence with at least one field used for indicating a TB; or the indication field is a field used for indicating a code word.

Specifically, existing DCI (that is, the first DCI used as an example) includes the field used for indicating a transport block (Transport Block, TB), and the TB is in a one-to-one correspondence with a code word. In a possible implementation, an indication field of at least one bit may be added into the field to carry a target information bit, so as to indicate an index of a higher layer parameter. When receiving the first DCI, the terminal device may determine, based on the one-to-one correspondence between the TB and the code word and the one-to-one correspondence between the index and the higher layer parameter, the target higher layer parameter corresponding to the target information bit.

In another possible implementation, a field used for indicating a code word may be directly added into the first DCI. In this case, the terminal device may directly determine, based on an information bit in this field, a target higher layer parameter corresponding to the code word.

It should be understood that the foregoing listed two types of indication fields are merely examples for description, and should not constitute any limitation on this application. This application does not exclude a case of adding the first indication information into another field in the first DCI.

S240: A transmit-end device sends the first data to the terminal device.

After the controller or the network device determines, in S220, the at least one group of target antenna ports for sending the first data, the transmit-end device may map, to the at least one group of target antenna ports, at least one group of code words to be sent, and send the at least one group of code words to the terminal device through the at least one group of target antenna ports.

Correspondingly, the terminal device receives the at least one piece of first indication information sent by the first network device and the first data sent by the transmit-end device.

S250: The terminal device demodulates the received first data based on the at least one piece of indication information.

Specifically, the terminal device may determine QCL configuration information of the at least one group of target antenna ports based on the one-to-one correspondence between the received at least one piece of indication information and the at least one group of code words, to demodulate the first data.

Optionally, S250 may specifically include:

the terminal device determines, based on the second mapping relationship, the at least one set of target higher layer parameters corresponding to the at least one target information bit, where the second mapping relationship is used to indicate the mapping relationship between the indexes of the plurality of sets of higher layer parameters and the plurality of information bits;

the terminal device determines the at least one piece of QCL configuration information based on the at least one set of target higher layer parameters; and the terminal device demodulates the first data based on the at least one piece of QCL configuration information.

In other words, when receiving the first DCI, the terminal device may determine a target higher layer parameter based on a target information bit in each indication field, and then determine the QCL configuration information used for demodulating the first data, that is, determine an antenna port that has a QCL relationship with the at least one group of target antenna ports. In this way, the terminal device may obtain the first data.

In this embodiment of this application, the antenna port that has a QCL relationship with a target antenna port may be, for example, a CRS port or a CSI-RS port. For example, it can be learned, from the higher layer parameter listed in step 230, that the higher layer parameter includes the CRS configuration and/or the non-zero power CSI-RS configuration. In this case, a CRS port or a CSI-RS port that has a QCL relationship with a DMRS port may be determined.

Therefore, according to the method used for data transmission in this embodiment of this application, antenna ports are grouped; at least one group of code words to be sent to a same terminal device is mapped to a group of antenna ports meeting QCL, to send data; and indication information is sent to the terminal device based on a mapping relationship between at least one group of code words and at least one group of target antenna ports, and is used by the terminal device to determine QCL configuration information used for demodulating the data. Compared with indication information sending based on an antenna port in the prior art, this method is more applicable to coordinated transmission/reception in NR, and is relatively flexible.

It should be understood that the foregoing first mapping relationship and second mapping relationship may be preconfigured through negotiation between the network device and the terminal device, or may be sent from the network device to the terminal device. This is not particularly limited in this application.

It should be further understood that the method, listed in the method 200, of indicating an index of a higher layer parameter through DCI to help the terminal device determine the QCL configuration information is merely an example for description, and should not constitute any limitation on this application. For example, the first network device may further directly add a higher layer parameter in the DCI, and directly send the higher layer parameter to the terminal device. In this case, the terminal device may directly determine the QCL configuration information based on the higher layer parameter. For another example, the first network device may further deliver a higher layer parameter to the terminal device by directly using RRC signaling, so that the terminal device determines the QCL configuration information based on the higher layer parameter.

With reference to FIG. 2, the foregoing describes in detail the method used for data transmission in this embodiment of this application. When a transmit-end device sends only two groups of code words to a same terminal device, an embodiment of this application provides another method used for data transmission. With reference to FIG. 3, the following describes in detail a method used for data transmission according to another embodiment of this application.

FIG. 3 is a schematic flowchart of a method 300, described from a perspective of device interaction, used for data transmission according to an embodiment of this application. The method 300 may be used for a communications system that uses a wireless air interface for communication. The communications system may include at least one network device and at least one terminal device. For example, the communications system may be the wireless communications system 100 shown in FIG. 1.

Optionally, the network device may be a transmission/reception point (TRP) or a base station, or may be another network device used for sending downlink control information (DCI). This is not particularly limited in this application.

Without loss of generality, the following describes the method 300 in detail by still using interaction between a first network device and a terminal device as an example. It should be understood that the first network device may be any network device that may serve as a serving network device and that is in the foregoing at least one network device. For example, the first network device may be the first network device in the method 200, or may be different from the first network device in the method 200. This is not particularly limited in this application. "First" is used only for differentiation and description, but should not constitute any limitation on this application. It should be further understood that the terminal device may be connected to and communicate with the first network device, and may further perform data communication with one or more other network devices (for example, a second network device). This is not particularly limited in this application.

As shown in FIG. 3, the method 300 includes the following steps.

S310: The first network device determines a plurality of groups of antenna ports.

S320: The first network device determines two groups of target antenna ports used for sending second data.

To differentiate from the first data in the method 200, data sent by the transmit-end device to the terminal device is denoted as the second data herein. The second data may be obtained by the transmit-end device by mapping two groups of code words (for example, a code word group #A and a code word group #B) to the two groups of target antenna ports (for example, an antenna port group #A and an antenna port group #B), and the obtained data (for example, data A corresponding to the code word group #A and data B corresponding to the code word group #B) is sent to the terminal device through the two groups of target antenna ports. It can be understood that each of the antenna port group #A and the antenna port group #B that are used as examples herein may include one or more antenna ports. This is not particularly limited in this application.

It should be understood that specific processes of S310 and S320 are similar to the specific processes of S210 and S220 in the method 200. For brevity, details are not described herein.

S330: The first network device sends second indication information to the terminal device.

The second indication information may be used to indicate whether the two groups of target antenna ports meet QCL. Specifically, the second indication information may be used to indicate whether any antenna port in the antenna port group #A and any antenna port in the antenna port group #B meet QCL. It can be understood that any two antenna ports in a same group of antenna ports meet QCL. If any antenna port in the antenna port group #A and any antenna port in the antenna port group #B do not meet QCL, it is considered that the antenna port group #A and the antenna port group #B do not meet QCL; if any antenna port in the antenna port group #A and any antenna port in the antenna port group #B meet QCL, it is considered that the antenna port group #A and the antenna port group #B meet QCL.

Optionally, S330 may specifically include:

The first network device sends second DCI to the terminal device, where the second DCI includes the second indication information.

Herein, to differentiate from the first DCI in the method 200, the DCI sent by the first network device to the terminal device is denoted as the second DCI. It should be understood that the second DCI and the first DCI may be same DCI, or may be different DCI. This is not particularly limited in this application.

S340: A transmit-end device sends second data to the terminal device.

Correspondingly, the terminal device receives the second indication information and the second data.

It should be understood that specific processes of S340 and S350 are similar to the specific processes of S240 and S250 in the method 200. For brevity, details are not described herein.

S350: The terminal device demodulates the received second data based on the second indication information.

It can be learned from the foregoing description that the second data received by the terminal device is obtained by mapping the two groups of code words respectively to the two groups of target antenna ports for sending. If the two groups of target antenna ports corresponding to the two groups of code words do not meet QCL, QCL configuration information corresponding to the two groups of target antenna ports needs to be used to respectively perform data demodulation on the data (for example, data A and data B) corresponding to the two groups of code words. If the two groups of target antenna ports corresponding to the two groups of code words meet QCL, same QCL configuration information may be used to simultaneously perform data demodulation on the data (for example, data A and data B) corresponding to the two groups of code words.

It should be noted that, in the prior art, second DCI sent by the first network device to the terminal device includes information about a port number of an antenna port used for sending data, a scrambling identity ID, and a mapping relationship between a code word and a layer, and the terminal device may perform data demodulation based on the foregoing information. In this embodiment of this application, the first network device sends 1-bit indication information (that is, the second indication information) to the terminal device to indicate whether the two groups of target antenna ports meet QCL, and then data demodulation is performed by using pilot information that is used for data demodulation and that is included in the existing DCI.

Therefore, according to the method used for data transmission in this embodiment of this application, the two groups of code words are mapped to the two groups of antenna ports, respectively, and the second indication information indicates whether the two groups of target antenna ports meet QCL, so as to determine whether to separately demodulate or simultaneously demodulate the data corresponding to the two groups of code words. Compared with 2-bit PQI indication information in the prior art, 1-bit overheads are reduced, and this method is also quite flexible and convenient.

It should be understood that sequence numbers of the foregoing processes do not mean execution orders in various embodiments of this application. The execution orders of the processes should be determined based on functions and internal logic of the processes, and should not constitute any limitation on the implementation processes of the embodiments of this application.

With reference to FIG. 2 and FIG. 3, the foregoing describes in detail the methods used for data transmission according to the embodiments of this application. With reference to FIG. 4 to FIG. 7, the following describes in detail apparatuses used for data transmission according to embodiments of this application.

Figure 4:
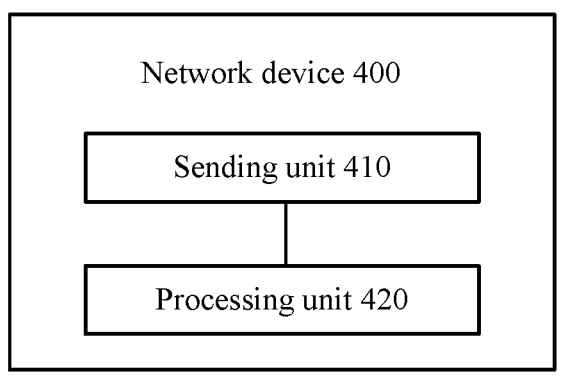
FIG. 4 is a schematic block diagram of a network device according to an embodiment of this application.

An embodiment of this application provides a network device. A schematic block diagram of the network device may be shown in FIG. 4. FIG. 4 is a schematic block diagram of a network device 400 according to this embodiment of this application. As shown in FIG. 4, the network device 400 includes a sending unit 410 and a processing unit 420.

Specifically, the network device 400 may be corresponding to the network device in the method 200 or method 300 used for data transmission according to the embodiments of this application. The network device 400 may include a unit for performing the method performed by the first network device in the method 200 in FIG. 2 or the method 300 in FIG. 3. In addition, units in the network device 400 and the foregoing other operations and/or functions are intended to implement the corresponding procedure in the method 200 in FIG. 2 or the method 300 in FIG. 3. For brevity, details are not described herein again.

Figure 5:
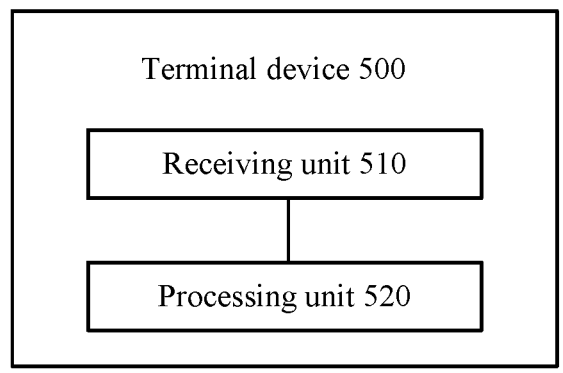
FIG. 5 is a schematic block diagram of a terminal device according to an embodiment of this application.

An embodiment of this application provides a terminal device. A schematic block diagram of the terminal device may be shown in FIG. 5. FIG. 5 is a schematic block diagram of a terminal device 500 according to this embodiment of this application. As shown in FIG. 5, the terminal device 500 includes a receiving unit 510 and a processing unit 520.

Specifically, the terminal device 500 may be corresponding to the terminal device in the method 200 or method 300 used for data transmission according to the embodiments of this application. The terminal device 500 may include a unit for performing the method performed by the terminal device in the method 200 in FIG. 2 or the method 300 in FIG. 3. In addition, units in the terminal device 500 and the foregoing other operations and/or functions are intended to implement the corresponding procedure in the method 200 in FIG. 2 or the method 300 in FIG. 3. For brevity, details are not described herein again.

Figure 6:
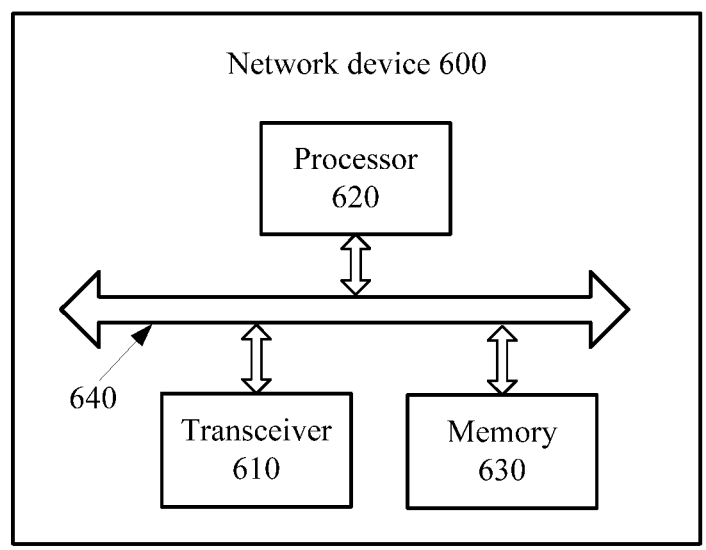
FIG. 6 is a schematic block diagram of a network device according to another embodiment of this application.

An embodiment of this application further provides a network device. A schematic block diagram of the network device may be shown in FIG. 6. FIG. 6 is a schematic block diagram of a network device 600 according to another embodiment of this application. As shown in FIG. 6, the network device 600 includes a transceiver 610, a processor 620, a memory 630, and a bus system 640. The transceiver 640, the processor 620, and the memory 630 are connected by using the bus system 640. The memory 630 is configured to store an instruction, and the processor 620 is configured to execute the instruction stored in the memory 630, to control the transceiver 610 to receive/send a signal. The memory 630 may be configured in the processor 620, or may be independent of the processor 620.

Specifically, the network device 600 may be corresponding to the network device in the method 200 or method 300 used for data transmission according to the embodiments of this application. The network device 600 may include an entity unit for performing the method performed by the first network device in the method 200 in FIG. 2 or the method 300 in FIG. 3. In addition, entity units in the network device 600 and the foregoing other operations and/or functions are intended to implement the corresponding procedure in the method 200 in FIG. 2 or the method 300 in FIG. 3. For brevity, details are not described herein again.

Figure 7:
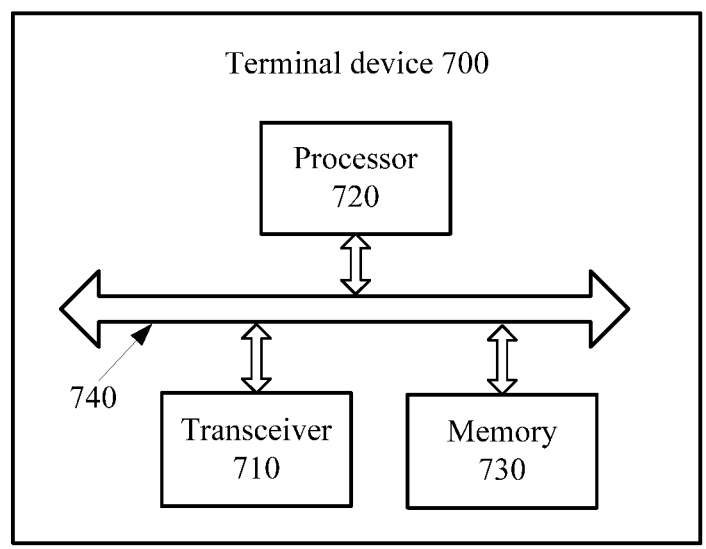
FIG. 7 is a schematic block diagram of a terminal device according to another embodiment of this application.

An embodiment of this application further provides a terminal device. A schematic block diagram of the terminal device may be shown in FIG. 7. FIG. 7 is a schematic block diagram of a terminal device 700 according to another embodiment of this application. As shown in FIG. 7, the terminal device 700 includes a transceiver 710, a processor 720, a memory 730, and a bus system 740. The transceiver 740, the processor 720, and the memory 730 are connected by using the bus system 740. The memory 730 is configured to store an instruction, and the processor 720 is configured to execute the instruction stored in the memory 730, to control the transceiver 710 to receive/send a signal. The memory 730 may be configured in the processor 720, or may be independent of the processor 720.

Specifically, the terminal device 700 may be corresponding to the terminal device in the method 200 or method 300 used for data transmission according to the embodiments of this application. The terminal device 700 may include an entity unit for performing the method performed by the terminal device in the method 200 in FIG. 2 or the method 300 in FIG. 3. In addition, entity units in the terminal device 700 and the foregoing other operations and/or functions are intended to implement the corresponding procedure in the method 200 in FIG. 2 or the method 300 in FIG. 3. For brevity, details are not described herein again.

It should be understood that the processor in the embodiments of this application may be an integrated circuit chip that has a signal processing capability. In an implementation process, the steps in the foregoing method embodiments may be implemented by using an integrated logic circuit of hardware in the processor, or by using instructions in a form of software. The processor may be a central processing unit (Central Processing Unit, CPU), or the processor may be another general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. The steps in the methods disclosed with reference to the embodiments of this application may be directly executed and completed by using a hardware decoding processor, or may be executed and completed by using a combination of hardware and software components in the decoding processor. A software component may be located in a mature storage medium in the art, such as a random memory, a flash memory, a read-only memory, a programmable read-only memory, an electrically erasable programmable memory, a register, or the like. The storage medium is located in the memory, and the processor reads information in the memory, and completes the steps in the foregoing methods in combination with hardware of the processor.

It should be further understood that the memory in the embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and used as an external cache. Through illustrative but not limitative description, many forms of RAMS may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DR RAM). It should be noted that the memory of the systems and the methods described in this specification includes but is not limited to these and any memory of another proper type.

It should be further understood that the bus system may further include a power bus, a control bus, a status signal bus, and the like, in addition to a data bus. However, for clear description, various types of buses are marked as the bus system in figures.

In an implementation process, the steps in the foregoing methods may be implemented by using an integrated logic circuit of hardware in the processor, or by using instructions in a form of software. The steps in the methods that are used for data transmission and that are disclosed with reference to the embodiments of this application may be directly executed and completed by using a hardware processor, or may be executed and completed by using a combination of hardware and software components in the processor. A software component may be located in a mature storage medium in the art, such as a random memory, a flash memory, a read-only memory, a programmable read-only memory, an electrically erasable programmable memory, a register, or the like. The storage medium is located in the memory, and the processor reads information in the memory, and completes the steps in the foregoing methods in combination with hardware of the processor. To avoid repetition, details are not described herein again.

An embodiment of this application further provides a computer-readable storage medium. The computer-readable storage medium stores one or more programs. The one or more programs include an instruction. When the instruction is executed by a portable electronic device that includes a plurality of application programs, the portable electronic device can perform the method in the embodiment shown in FIG. 2.

An embodiment of this application further provides a computer-readable storage medium. The computer-readable storage medium stores one or more programs. The one or more programs include an instruction. When the instruction is executed by a portable electronic device that includes a plurality of application programs, the portable electronic device can perform the method in the embodiment shown in FIG. 3.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing systems, apparatuses, and units, refer to corresponding processes in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may be or may not be physically separated, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions used for instructing a computer device (which may be a personal computer, a server, a network device, or the like) to perform all or some of the steps in the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for data transmission, comprising:
receiving, by a terminal device, second indication information from a network device, wherein the second indication information is 1-bit indication information which indicates whether a second group of antenna ports is quasi-co-located with a first group of antenna ports;
receiving, by the terminal device, first data from the first group of antenna ports and second data from the second group of antenna ports, wherein the first data comprises a first group of code words corresponding to the first group of antenna ports and the second data comprises a second group of code words corresponding to the second group of antenna ports; and
demodulating, by the terminal device, the first data and the second data based on the second indication information.

2. A terminal, comprising a processor and a non-transitory computer-readable medium having processor-executable instructions stored thereon, wherein the processor-executable instructions, when executed by the processor, facilitate:
receiving second indication information from a network device, wherein the second indication information is 1-bit indication information which indicates whether a second group of antenna ports is quasi-co-located with a first group of antenna ports;
receiving first data from the first group of antenna ports and second data from the second group of antenna ports, wherein the first data comprises a first group of code words corresponding to the first group of antenna ports and the second data comprises a second group of code words corresponding to the second group of antenna ports; and
demodulating the first data and the second data based on the second indication information.

3. A network device, comprising a processor and a non-transitory computer-readable medium having processor-executable instructions stored thereon, wherein the processor-executable instructions, when executed by the processor, facilitate:
determining a first group of antenna ports and a second group of antenna ports, wherein antenna ports of the first group of antenna ports are quasi-co-located and antenna ports of the second group of antenna ports are quasi-co-located;
sending second indication information to a terminal, wherein the second indication information is 1-bit indication information which indicates whether the second group of antenna ports is quasi-co-located with the first group of antenna ports; and
sending first data via the first group of antenna ports and second data via the second group of antenna ports to the terminal, wherein the first data comprises a first group of code words corresponding to the first group of antenna ports and the second data comprises a second group of code words corresponding to the second group of antenna ports.

4. The method according to claim 1, wherein the network device is a transmission/reception point (TRP) or a base station.

5. The method according to claim 1, wherein receiving the second indication information is based on receiving second downlink control information (DCI) from the network device, wherein the second DCI comprises the second indication information.

6. The method according to claim 1, wherein demodulating the first data and the second data based on the second indication information further comprises:
determining whether to separately demodulate or simultaneously demodulate the first data and the second data based on the second indication information.

7. The terminal according to claim 2, wherein the network device is a transmission/reception point (TRP) or a base station.

8. The terminal according to claim 2, wherein receiving the second indication information is based on receiving second downlink control information (DCI) from the network device, wherein the second DCI comprises the second indication information.

9. The terminal according to claim 2, wherein demodulating the first data and the second data based on the second indication information further comprises:
   determining whether to separately demodulate or simultaneously demodulate the first data and the second data based on the second indication information.

10. The network device according to claim 3, wherein the network device is a transmission/reception point (TRP) or a base station.

11. The network device according to claim 3, wherein sending the second indication information is based on sending second downlink control information (DCI) to the terminal, wherein the second DCI comprises the second indication information.

\* \* \* \* \*